United States Patent
Lyons et al.

(10) Patent No.: US 7,098,460 B2
(45) Date of Patent: Aug. 29, 2006

(54) MONOLITHIC STRUCTURE FOR X-RAY CT COLLIMATOR

(75) Inventors: Robert Joseph Lyons, Burnt Hills, NY (US); Martin Kin-Fei Lee, Niskayuna, NY (US); Venkat Subramaniam Venkataramani, Clifton Park, NY (US); Clifford Bueno, Clifton Park, NY (US); James Walter LeBlanc, Niskayuna, NY (US); James Scott Vartuli, Rexford, NY (US); Charles David Greskovich, Schenectady, NY (US); Stephen F. Bancheri, Altamont, NY (US)

(73) Assignee: General Electric Company, Niskayuna, NY (US)

( * ) Notice: Subject to any disclaimer, the term of this patent is extended or adjusted under 35 U.S.C. 154(b) by 213 days.

(21) Appl. No.: 10/633,969

(22) Filed: Aug. 4, 2003

(65) Prior Publication Data

US 2005/0029462 A1    Feb. 10, 2005

(51) Int. Cl.
*G01T 1/20*    (2006.01)
(52) U.S. Cl. .............. 250/367; 250/363.1; 250/370.09; 250/370.11
(58) Field of Classification Search ............. 250/367, 250/368, 363.1, 370.11, 370.09, 366, 370.08; 430/220; 378/4, 7
See application file for complete search history.

(56) References Cited

U.S. PATENT DOCUMENTS

| | | | |
|---|---|---|---|
| 4,187,427 A * | 2/1980 | Cusano ................... | 250/370.09 |
| 4,242,221 A * | 12/1980 | Cusano et al. ............. | 264/1.21 |
| 4,262,202 A * | 4/1981 | Cusano et al. ............. | 250/366 |
| 4,415,808 A * | 11/1983 | Cusano et al. ............. | 250/367 |
| 4,870,279 A * | 9/1989 | Cueman et al. ............. | 250/368 |
| 5,117,114 A * | 5/1992 | Street et al. ........... | 250/370.11 |
| 5,773,829 A * | 6/1998 | Iwanczyk et al. ........... | 250/367 |
| 6,271,525 B1* | 8/2001 | Majewski et al. .......... | 250/367 |
| 6,362,481 B1* | 3/2002 | Warren ....................... | 250/368 |
| 6,630,675 B1* | 10/2003 | Ghelmansarai ............. | 250/366 |
| 6,734,430 B1* | 5/2004 | Soluri et al. ............. | 250/363.1 |
| 6,921,909 B1* | 7/2005 | Nagarkar et al. ......... | 250/483.1 |
| 2004/0217291 A1* | 11/2004 | Hoge ....................... | 250/363.1 |
| 2004/0251420 A1* | 12/2004 | Sun ........................ | 250/370.09 |

* cited by examiner

*Primary Examiner*—David Porta
*Assistant Examiner*—Faye Boosalis
(74) *Attorney, Agent, or Firm*—Fletcher Yoder

(57) ABSTRACT

A conversion device for use in an imaging system is provided. The conversion device includes a first perforated plate portion forming a plurality of collimator channels separated by a plurality of thin collimator walls. A second perforated plate portion forming a plurality of scintillator channels separated by a plurality of thin scintillator walls is attached to the first perforated plate portion. A reflective coating is applied to the inside scintillator surface of the plurality of thin scintillator walls. A scintillator material is filled into the plurality of scintillator channels.

19 Claims, 3 Drawing Sheets

MONOLITHIC STRUCTURE FOR X-RAY CT COLLIMATOR

TECHNICAL FIELD

The present invention relates generally to a monolithic structure for use in computed tomography systems, and more particularly, to a monolithic structure providing both collimator and scintillator functions for computed tomography systems.

BACKGROUND OF THE INVENTION

Computed tomography utilizes x-rays to generate images. These images, in turn, can be utilized in a wide variety of applications such as medical imaging. Computed tomography detectors are typically used to translate the x-rays passed through an imaging object into electronic data that is used to generate images. CT detectors are commonly based on structured x-ray to light conversion scintillators of phosphor materials. Scintillators are utilized to convert x-rays into light photons. These light photons may then be converted into electrical impulses by elements such as photodiodes.

In some CT applications, high x-ray absorption is required. These applications often require the use of thick dense scintillator structures. Existing scintillator structures commonly are comprised of diced single crystals or transparent ceramic imaging plates. An important consideration, however, is the prevention or minimization of pixel to pixel contamination of the light produced within each luminescent module of the scintillator structures. In order to minimize this contamination, the scintillator plates have been diced and reflectors have been introduced in an effort to maintain as much of the generated light remaining within an individual pixel as possible.

The problems arising from contamination have further grown as CT technology has moved towards the use of smaller and smaller diode arrays. The smaller diode arrays require the use of smaller pixel arrays. Thus the pixel arrays must often be more finely divided and the pixel size must be reduced. Traditional methodologies for scintillator production such as dicing crystals and ceramics can become increasingly expensive as additional cuts and finer definition is required. When pixel size has been over 1 mm in pitch, inner diameter and outer diameter dicing has been successful in separating luminescent ceramics or single crystals into individualized pixels for mating to photodiode arrays. For the reduced size pixel arrays, however, existing attempts have turned to phosphors such as needles of CsI as well as phosphors deposited onto fiber optic face plates. These systems have been used to convey light into finely pitched pixels. These materials, however, are often found to not be adequate or desirable in terms of their luminescent or absorption properties for the more stringent requirements of many CT applications. In computed tomography, the afterglow and gain instability of the CsI will result in artifacts in the resultant CT image set. While the absorption characteristics of phosphors on fiber optics make this technology undesirable as-dose considerations to the patient becomes a concern.

To facilitate image reconstruction, the pixels of single crystals or ceramic scintillators are optically separated with a reflector material. The optimal reflector system is one that is very thin so it does not contribute a significant fraction to the overall surface area of the array exposed to x-rays. Often, very thin reflectors (except those comprised of metal) will leak light from neighboring channels. This often leads to image quality degradation. By increasing the reflector thickness to reduce the light leakage or cross talk, the overall efficiency of the array to converting x-rays to light is reduced due to the decreased surface fraction of scintillator.

Similar problems are exhibited in existing collimator designs. Current methods often require that individual plates of tungsten be placed at the correct angle to the beam to reduce scatter. As the detector pitch gets smaller, and the CT detectors get larger, the task of properly placing the collimators becomes difficult. It can also result in excessive production and assembly costs. Thus a technology that addressed both the limitations of existing scintillator designs as well as the limitations of collimator designs would be highly beneficial to the use of conversion devices in modern computer tomography systems.

It would, therefore, be highly desirable to have a methodology of scintillator construction and production that was suited for small pixel arrays. It would additionally be highly desirable to have a methodology that could further incorporate inexpensive and reliable production techniques. Finally, it would be highly desirable to develop a technology that could advance both collimator and scintillator design and performance.

SUMMARY OF THE INVENTION

A conversion device for use in an imaging system is provided. The conversion device includes a first perforated plate portion forming a plurality of collimator channels separated by a plurality of thin collimator walls. A second perforated plate portion forming a plurality of scintillator channels separated by a plurality of thin scintillator walls is attached to the first perforated plate portion. A reflective coating is applied to the inside scintillator surface of the plurality of thin scintillator walls. A scintillator material is filled into the plurality of scintillator channels.

Other features of the present invention will become apparent when viewed in light of the detailed description of the preferred embodiment when taken in conjunction with the attached drawings and appended claims.

DESCRIPTION OF THE PREFERRED EMBODIMENT(S)

Figure 1:
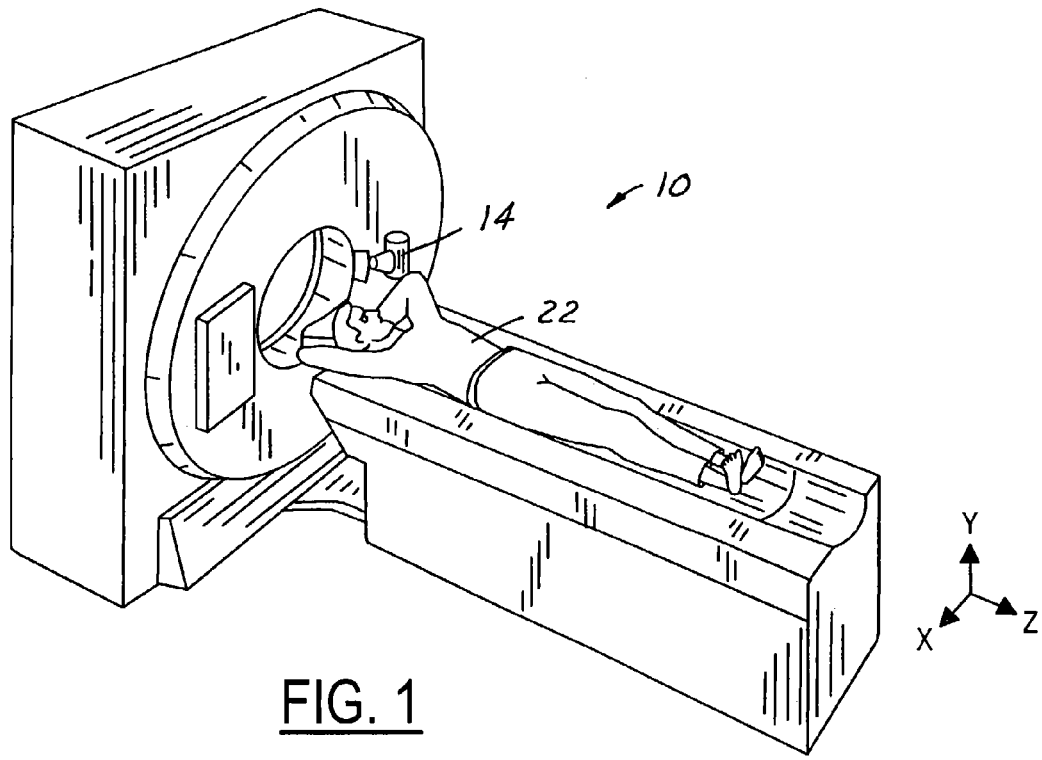
FIG. 1 is an illustration of a medical imaging system for use with a conversion device assembly in accordance with one embodiment of the present invention.
Figure 2:
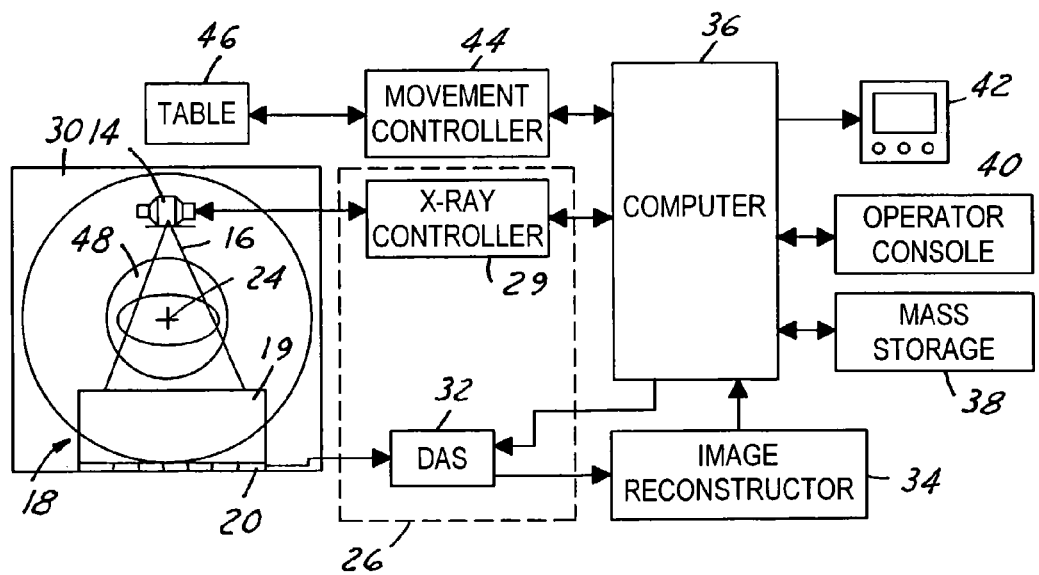
FIG. 2 is a detailed illustration of the medical imaging system as described in FIG. 1.

Referring now to FIG. 1, which is an illustration of a computed tomography (CT) imaging system 10 for use with the conversion device 19 of the present invention. Although a particular CT imaging system 10 has been illustrated, it should be understood that the conversion device of the present invention can be utilized in a wide variety of imaging systems. The CT imaging system 10 includes a scanner assembly 12 illustrated as a gantry assembly. The scanner assembly 12 includes an x-ray source 14 for projecting a beam of x-rays 16 toward a detector assembly 18 positioned opposite the x-ray source 14. A detector assembly 18 includes both the conversion device 19 as well as a plurality of detector elements 20 which combine to sense the projected x-rays 16 that pass through an object, such as a medical patient 22. Each of the plurality of detector elements 20 produces an electrical signal that represents the intensity of an impinging x-ray beam and hence the attenuation of the beam 16 as it passes through the object of patient 22. Commonly, during a scan to acquire x-ray projection data, the scanner assembly 12 is rotated about the center of rotation 24. In one embodiment, illustrated in FIG. 2, detector elements 20 are arranged in one row such that projection data corresponding to a single image slice is acquired during a scan. In other embodiments, the detector elements 20 can be arranged in a plurality of parallel rows, such that projection data corresponding to a plurality of parallel slices can be acquired simultaneously during a scan.

The rotation of the scanner assembly 12 and the operation of the x-ray source 14 are preferably governed by a control mechanism 26. The control mechanism 26 preferably includes an x-ray controller 29 that provides power and timing signals to the x-ray source 14 and a scanner motor controller 30 that controls the rotational speed and position of the scanner assembly 12. A data acquisition system (DAS) 32 in control mechanism 26 samples analog data from the detector elements 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38.

The computer 36 also can receive commands and scanning parameters from an operator via console 40 that has a keyboard or similar input device. An associated display 42 allows the operator to observe the reconstructed image and other data from the computer 36. The operator supplied commands and parameters are used by computer 36 to provide control signals and information to the DAS 32, x-ray controller 28, and scanner motor controller 30. In addition, the computer 36 operates a table motor controller 44 which controls a motorized table 46 to position patient 22 within the scanner assembly 12. Particularly, the table 46 moves portions of the patient 22 through the scanner opening 48.

Each of the detector elements 20 of the detector assembly 18 produces a separate electrical signal that is a measurement of the beam attenuation at the detector location. The x-ray photons 16, however, must first be converted into a form in which the detector elements 20 can properly process them. The present invention provides a novel conversion device 19 and method for producing same. The conversion device 19 includes a first perforated plate portion 50 forming a plurality of collimator channels 52 separated by a plurality of thin collimator walls 54 (see FIGS. 3 and 4). The first perforated plate portion 50 can be formed using a wide variety of known perforation techniques on preferably a plate made of a high atomic number metal. In one embodiment copper is utilized to form the first perforated plate portion 50. Through the use of a first perforate plate portion 50 to generate the collimator channels 52, an inexpensive and high density collimator 56 is generated. The collimator channel depth 58 need only be sufficient for the collimator channels 52 to generate proper collimator functionality for a given application. Although the collimator channels 52 may be formed in a variety of sizes for a variety of applications, one embodiment contemplates a channel pitch 60 of less than 2 mm. This embodiment further contemplates a collimator channel width 62 of less than 500 microns and a collimator wall thickness 64 of approximately 100 microns. It should be understood, however, that collimator channel width 62 can be modified depending on the resolution requirements of a specific application. Collimator wall thickness 64 should be selected by matching structural integrity and the required absorption of radiation.

Figure 3:
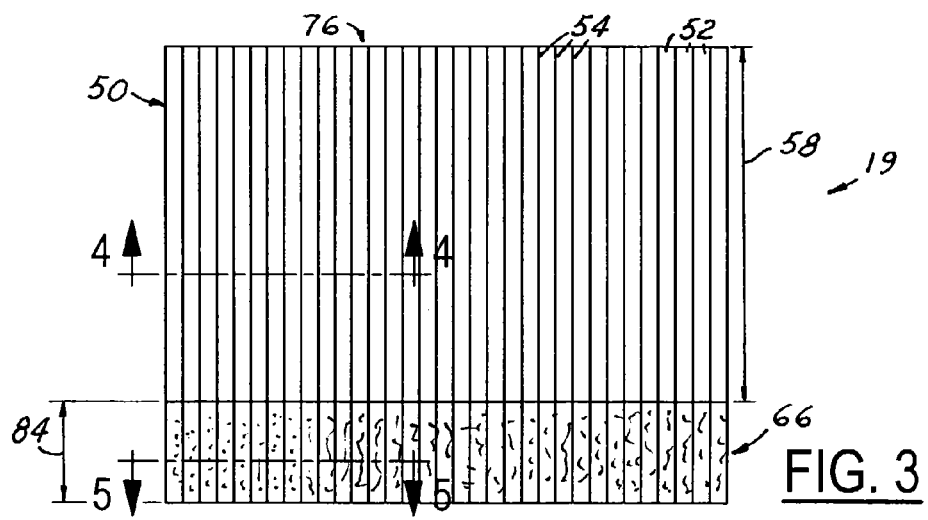
FIG. 3 is a side view illustration of a conversion device in accordance with the present invention.
Figure 4:
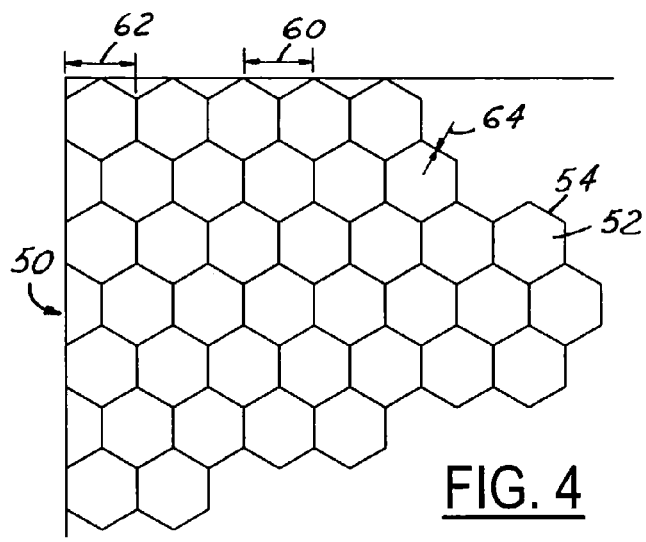
FIG. 4 is a cross-sectional illustration of the conversion device illustrated in FIG. 3, the cross section taken along the lines 4—4 in the direction of the arrows.
Figure 5:
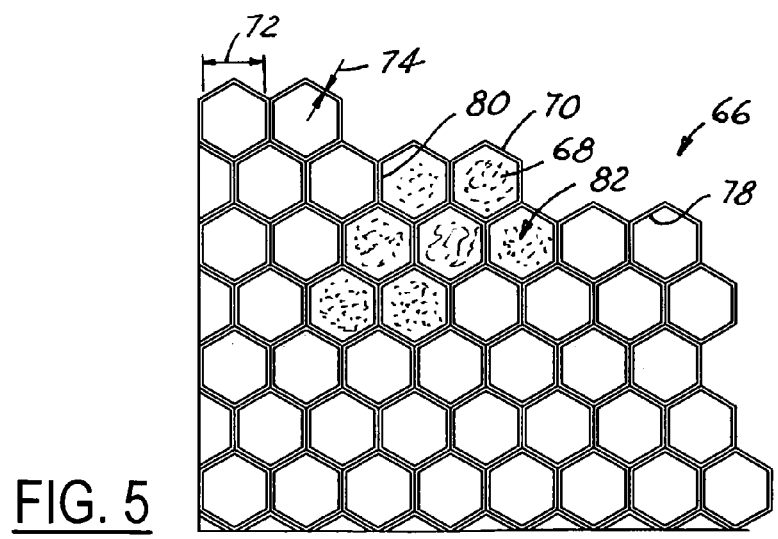
FIG. 5 is a cross-sectional illustration of the conversion device illustrated in FIG. 3, the cross section taken along the lines 5—5 in the direction of the arrows.

The present invention further includes a second perforated plate portion 66 forming a plurality of scintillator channels 68 separated by a plurality of scintillator thin walls 70 (see FIGS. 3 and 5). The scintillator channels 68 preferably have a scintillator width 72 and a scintillator wall thickness 74. Although the second perforated plate portion 66 may be formed separately from the first perforated plate portion 50, in one embodiment it is contemplated that they may be formed from a single perforated plate 76. Thus the pitch, width, and wall thickness may all match those of the collimator channels 52. The scintillator width 72 is preferably on the order of 200 microns to allow adequate impregnation of the scintillator channels 68 as will be further discussed. The second perforated plate portion 66 may also be formed as an independent plate coupled to the first perforated plate portion 50 such that a separate scintillator and collimator are formed. The scintillator channels 68 need not match the collimator channels 52 cross-plate boundaries and can either be larger, smaller or the same size depending on the degree of beam collimation desired.

The scintillator channels 68 include a reflective coating 78 applied to the inner scintillator channel walls 80. The reflective coating 78 can comprise a wide variety of materials coated in a variety of fashions. One embodiment, however, contemplates the use of $TiO_2$ deposit coated onto the inner scintillator channel walls 80. The scintillator channels 68 are further filled with a scintillator material 82. A wide variety of scintillator materials 82 are known and contemplated by the present invention. Luminescent glass such as phosphor materials dispersed in a glassy matrix is one contemplated material. Luminescent polymer such as inorganic phosphor particles suspended in a polymer matrix is another. In still another embodiment, glass ceramic is utilized that forms crystalline particles after recrystallization. The selection of luminescent material to form the scintillator material 82 must be addressed to the intended application. The material must be obtained in a flowable condition at room temperature or at a temperature that is below both the oxidation temperature or slumping temperature of the perforated plate 76. The scintillator channel depth 84 may also be adjusted by controlling the penetration of the scintillator material 82 to application controlled requirements. The scintillator channel 68 may only be partially filled such that an instant collimator channel set 52 is generated above the scintillator channel 68.

Figure 6:
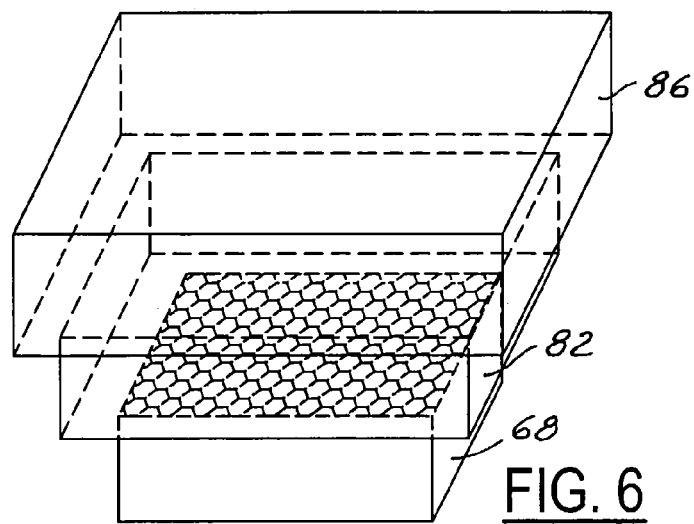
FIG. 6 an illustration of a method of manufacturing the conversion device illustrated in FIG. 3 in accordance with the present invention.
Figure 7:
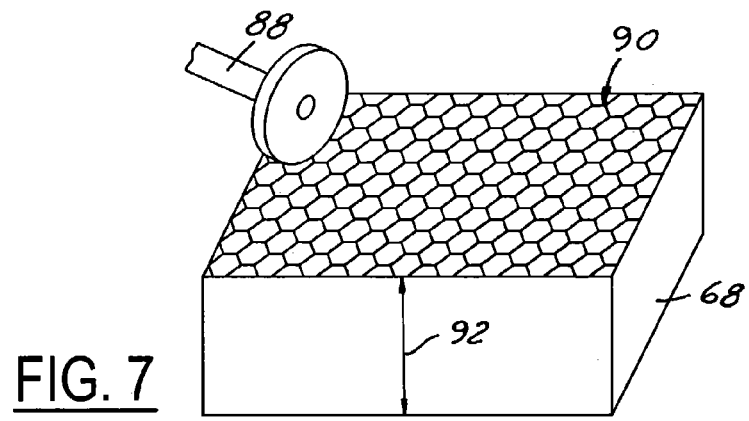
FIG. 7 is an illustration of a further process step for the manufacturing of the conversion device illustrated in FIG. 3, in accordance with the present invention.
Figure 8:
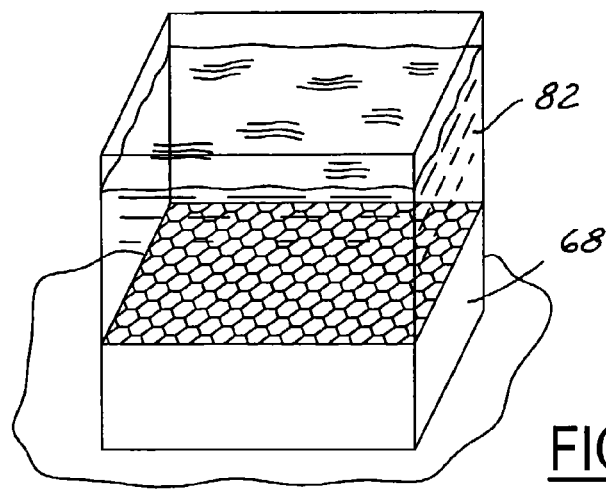
FIG. 8 is an illustration of an alternate manufacturing process for manufacturing the conversion device illustrated in FIG. 3 in accordance with the present invention.

Although a variety of methods for inserting the scintillator material 82 into the scintillator channels 68 may be utilized, several unique methods are illustrated in FIGS. 6 through 8.

In FIG. 6, the perforated plate element 68 is illustrated with a block of scintillator material 82 placed on top of it. The scintillator material 82 utilized in trials for this embodiment comprised a glass ceramic consisting of Ga2O3 in a zinc borate glass. Any luminescent material and/or ions that do not decompose when dispersed in a molten glass is applicable. In another example Hf02:Ti phosphor may be utilized. It is desirable to get a high percentage of phosphor embedded in the glass. The block of this material was placed on top of a perforated plate element 68 with 400 micron scintillator width 72 cavities. A low load 86 was placed on top of the scintillator material 68 to press it onto the perforated plate element 68. The scintillator material 68 was then heated to raise it to its slumping temperature wherein it flowed down into the scintillator channels 68. A grinder 88 (see FIG. 7) was then utilized to grind the remaining scintillator material 68 until it was co-planar with the perforated plate upper surface 90. It is further contemplated that the grinder 88 may be further implemented to grind down the perforated upper plate surface 90 as well to adjust the perforated plate depth 92.

In a second illustrative attempt, the perforated plate 68 was submerged in a phosphor material in a lead borosilicate glass mixture. A pellet of this mixture was formed with the perforated plate 68 embedded in it. The pellet was then sintered to form a glass ceramic. In this embodiment the scintillator material 68 was ground down on both the perforated upper plate surface 90 and the perforate lower plate surface 92. Although two manufacturing embodiments have been described, a wide variety of approaches and modifications are contemplated for manufacturing the present invention.

While particular embodiments of the invention have been shown and described, numerous variations and alternative embodiments will occur to those skilled in the art. Accordingly, it is intended that the invention be limited only in terms of the appended claims.

What is claimed is:

1. A conversion device for use in an imaging system comprising:
   a first perforated plate portion forming a plurality of collimator channels separated by a plurality of thin collimator walls;
   a second perforated plate portion forming a plurality of scintillator channels separated by a plurality of thin scintillator walls;
   reflective coating applied to the inside scintillator surface of said plurality of thin scintillator walls; and
   a luminescent glass or luminescent polymer scintillator material filling said plurality of scintillator channels.

2. A conversion device for use in an imaging system as in claim 1 wherein said first perforated plate portion and said second perforated plate portion are formed from a single perforated plate element.

3. A conversion device for use in an imaging system as in claim 1 wherein said collimator channels comprise a spacing pitch of less than or equal to 2 mm.

4. A conversion device for use in an imaging system as in claim 1 wherein said collimator channels comprise a collimator channel width less than 500 microns.

5. A conversion device for use in an imaging system as in claim 1 wherein said then collimator walls comprise a wall thickness of 100 microns.

6. A conversion device for use in an imaging system as in claim 1, wherein said luminescent glass comprises luminescent materials dispersed in a glassy matrix.

7. A conversion device for use in an imaging system as in claim 1, wherein said luminescent glass comprises a glass ceramic containing crystalline particles.

8. A conversion device for use in an imaging system as in claim 1, wherein said luminescent polymer comprises inorganic phosphor particles suspended in a polymer matrix.

9. A conversion device for use in an imaging system as in claim 1 wherein said plurality of thin collimator walls is comprised of a high atomic number metal.

10. A conversion device for use in an imaging system as in claim 1 wherein said first perforated plate portion comprises a perforated copper plate.

11. A conversion device for use in an imaging system as in claim 1 wherein said reflective coating comprises TiO2.

12. A conversion device for use in an imaging system as in claim 1 wherein said luminescent glass or luminescent polymer scintillator material does not decompose when dispersed in molten glass, said luminescent material suspended in said molten glass.

13. A conversion device for use in an imaging system comprising:
   a perforated plate forming a plurality of scintillator channels separated by a plurality of thin scintillator walls;
   reflective coating applied to the inside scintillator surface of said plurality of thin scintillator walls; and
   a luminescent glass or luminescent polymer scintillator material filling said plurality of scintillator channels.

14. A method of manufacturing a conversion device for use in an imaging system comprising:
   perforating a plate element to form a plurality of scintillator channels separated by a plurality of thin scintillator walls;
   coating an inside surface of said plurality of thin scintillator walls with a reflective coating; and
   filling said plurality of scintillator channels with a luminescent glass or luminescent polymer scintillator material.

15. A method of manufacturing a conversion device for use in an imaging system as described in claim 14, wherein said filling said plurality of scintillator channels comprises:
   placing a luminescent glass or luminescent polymer scintillator material on said perforated plate element;
   applying a load to said luminescent glass or luminescent polymer scintillator material such that said luminescent glass or luminescent polymer scintillator material is pressed onto said perforated plate element;
   heating said luminescent glass or luminescent polymer scintillator material to a slumping temperature such that said scintillator material fills said plurality of scintillator channels.

16. A method of manufacturing a conversion device for use in an imaging system as described in claim 14, further comprising:
   grinding said luminescent glass or luminescent polymer scintillator material such that a scintillator upper surface is planar with a perforated plate upper surface.

17. A method of manufacturing a conversion device for use in an imaging system as described in claim 16, further comprising:
   grinding said perforated plate upper surface such that a perforated plate depth is adjusted.

18. A method of manufacturing a conversion device for use in an imaging system as described in claim 14, wherein said filling said plurality of scintillator channels comprises:
   forming a block of luminescent glass or luminescent polymer scintillator material with said perforated plate element embedded within said block of scintillator material; and
   grinding said luminescent glass or luminescent polymer scintillator material such that a scintillator upper surface is planar with a perforated plate upper surface.

19. A method of manufacturing a conversion device for use in an imaging system as described in claim 14, wherein said luminescent glass or luminescent polymer scintillator material only partially fills said perforated plate element such that a scintillator function is generated by said luminescent glass or luminescent polymer scintillator material and a collimator function is generated by an unfilled portion.

* * * * *